United States Patent [19]

Ben-Zion

[11] Patent Number: 5,781,622
[45] Date of Patent: Jul. 14, 1998

[54] TWO-LINE APPARATUS FOR TELEPHONE INTERCOM

[76] Inventor: Kornizer Ben-Zion. 9 Hashked Street. Rush Hayin, Israel

[21] Appl. No.: 435,562

[22] Filed: May 5, 1995

[51] Int. Cl.$^6$ .............. H04M 1/00; H04M 1/60; H04M 13/00; H04M 1/66
[52] U.S. Cl. .............. 379/159; 379/171; 379/176; 379/186; 379/199
[58] Field of Search ............ 379/102, 159, 379/103, 160, 167–187, 199, 200, 372, 373, 375

[56] References Cited

U.S. PATENT DOCUMENTS

| | | | |
|---|---|---|---|
| 4,899,378 | 2/1990 | Hamer | 379/177 |
| 5,119,418 | 6/1992 | Dupillier | 379/373 |
| 5,247,570 | 9/1993 | Bowen | 379/180 |
| 5,280,523 | 1/1994 | Lee | 379/373 |
| 5,283,825 | 2/1994 | Druckman et al. | 379/167 |
| 5,425,089 | 6/1995 | Chan et al. | 379/177 |

*Primary Examiner*—Curtis Kuntz
*Assistant Examiner*—Paul Loomis
*Attorney, Agent, or Firm*—Lowe Hauptman Gopstein & Berner

[57] ABSTRACT

An apparatus for providing an intercom function on a telephone, without the need for an external power supply, having DTMF or pulse capabilities including an intercom operation device arranged for connection to a DTMF or pulse telephone line and to a DTMF or pulse telephone instrument. The apparatus includes a device for sensing an extension selection dual input from the DTMF or pulse telephone instrument and transmitting a corresponding extension address signal over the DTMF or pulse telephone line. Also included is an apparatus for sensing a received extension address signal from the telephone line, determining whether it corresponds to the telephone instrument to which the intercom operation apparatus is connected and, upon determination of correspondence, providing an extension selection ring output.

4 Claims, 13 Drawing Sheets

TWO-LINE APPARATUS FOR TELEPHONE INTERCOM

BACKGROUND OF THE INVENTION

There presently exist telephone systems having a number of features, which include an intercom feature providing internal communication between various extensions in the system. Such telephone systems are usually relatively complex and expensive and thus are not suitable for normal domestic or small business applications.

The present invention seeks to provide an apparatus for providing an intercom function, (hereinafter called "intercom function device") on an ordinary telephone line, without requiring the installation of an overall telephone system, and without the need for external power supply.

SUMMARY OF THE INVENTION

There is thus provided in accordance with a preferred embodiment of the present invention an apparatus for providing an intercom function on a telephone, without the need for external power supply, having DTMF/pulse capabilities including an intercom operation device arranged for connection to a DTMF/pulse telephone line and to a DTMF/pulse telephone instrument and comprising apparatus for sensing an extension selection dial input from the DTMF telephone instrument and transmitting a corresponding extension address signal over the DTMF telephone line and apparatus for sensing a received extension address signal from the telephone line, determining whether it corresponds to the telephone instrument to which the intercom operation apparatus is connected and upon determination of correspondence, providing an extension selection ring output.

Additionally, in accordance with another embodiment of the present invention, there is provided a system for providing an intercom function on a plurality of telephone lines having a DTMF/pulse capabilities connected to a telephone line including a plurality of intercom operation devices, each arranged for connection to a DTMF/pulse telephone line and to a DTMF/pulse telephone instrument and each comprising apparatus for sensing an extension selection dial input from the DTMF/pulse telephone instrument and transmitting a corresponding extension address signal over the DTMF/pulse telephone line and apparatus for sensing a received extension address signal from the telephone line, determining whether it corresponds to the telephone instrument to which the intercom operation apparatus is connected and upon determination for correspondence, providing an extension selection ring output.

In accordance with yet another embodiment of the invention, there may also be provided apparatus for effectively eliminating the busy tone when a telephone instrument is OFF-HOOK during intercom operation extending beyond a predetermined time interval.

Additionally, in accordance with a further embodiment of the invention, the system may include apparatus responsive to a telephone call from outside the system and to added DTMF/pulse dialed information identifying a given extension to be called, for causing only the given intercom function device identified by the added DTMF/pulse information to produce ringing and for preventing ringing of the remaining telephone instruments connected to other intercom function devices.

BRIEF DESCRIPTION OF THE DRAWINGS

The present invention will be understood and appreciated more fully from the following detailed description taken in conjunction with the drawings in which.

2

DETAILED DESCRIPTION OF THE INVENTION

Figure 1:
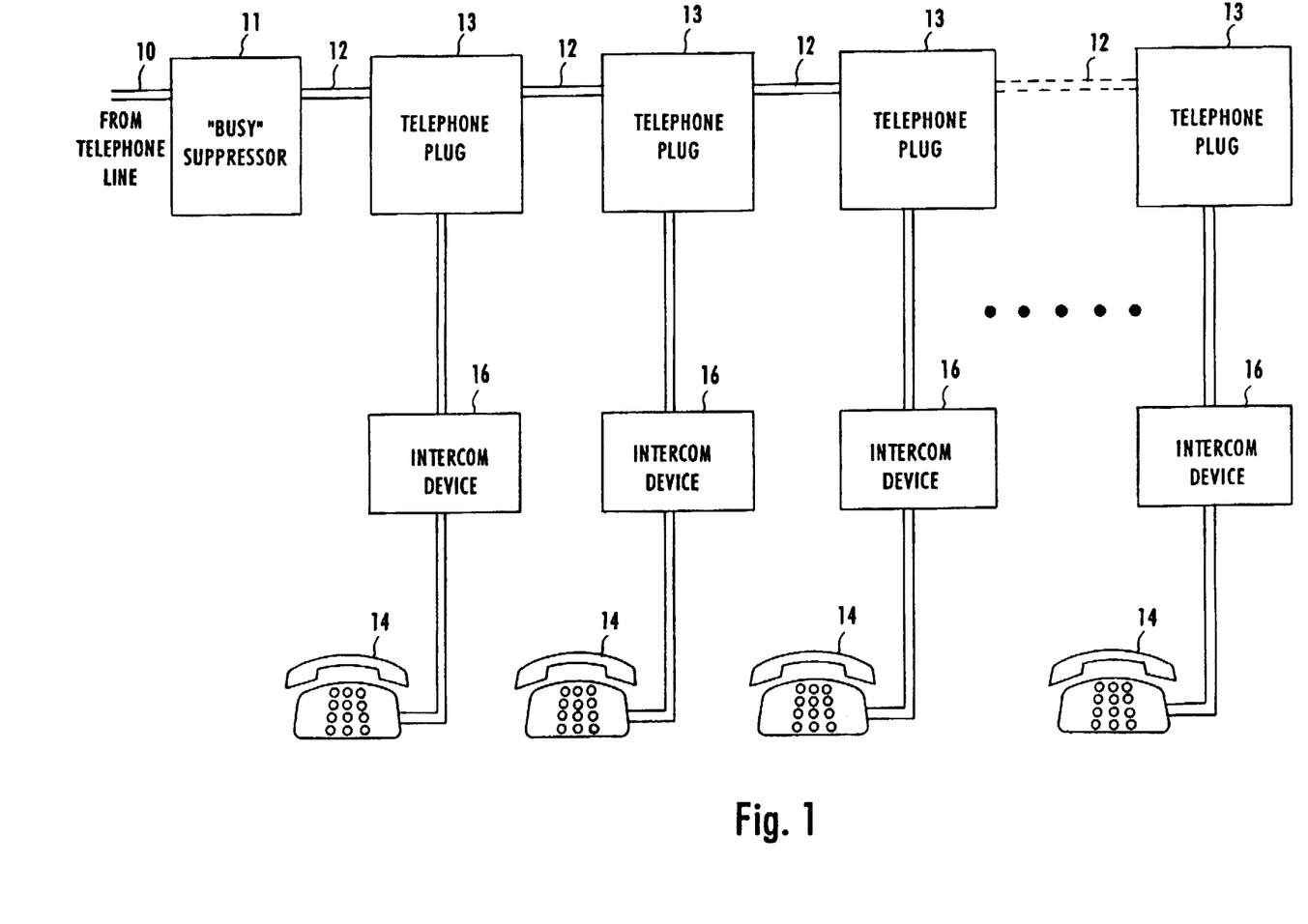
FIG. 1 is a block diagram illustration of a telephone intercom system constructed and operative in accordance with a preferred embodiment of the present invention.

Reference is now made to FIG. 1. which illustrates a telephone intercom system constructed and operated in accordance with a preferred embodiment of the present invention. The system includes a telephone line 10, which is directly connected to a central office providing DTMF/pulse service, as is the case in most domestic and small business installations in the U.S.A.

Connected to the telephone line 10, as in most existing telephone installations, is an internal telephone line 12, to which are connected a plurality of telephone plug sockets 13. Associated with each plug socket is a conventional DTMF/pulse telephone instrument 14. Each telephone instrument 14 is preferably connected to a corresponding telephone plug socket via an intercom function device 16, typically by means of two wires in conventional 4-wire telephone plus and sockets (not shown).

In accordance with a preferred embodiment of the invention, devices 16 provide the following principal functions:

1. Enable a user of a given telephone instrument 14 to call any other telephone instrument 14 to which a device 16 is connected, simply by a DTMF/pulse input.

2. Enable an outside caller to directly reach a particular telephone instrument 14 to which a device 16 is connected.

3. Enable a user to use the telephone line as a power source.

Figure 4:
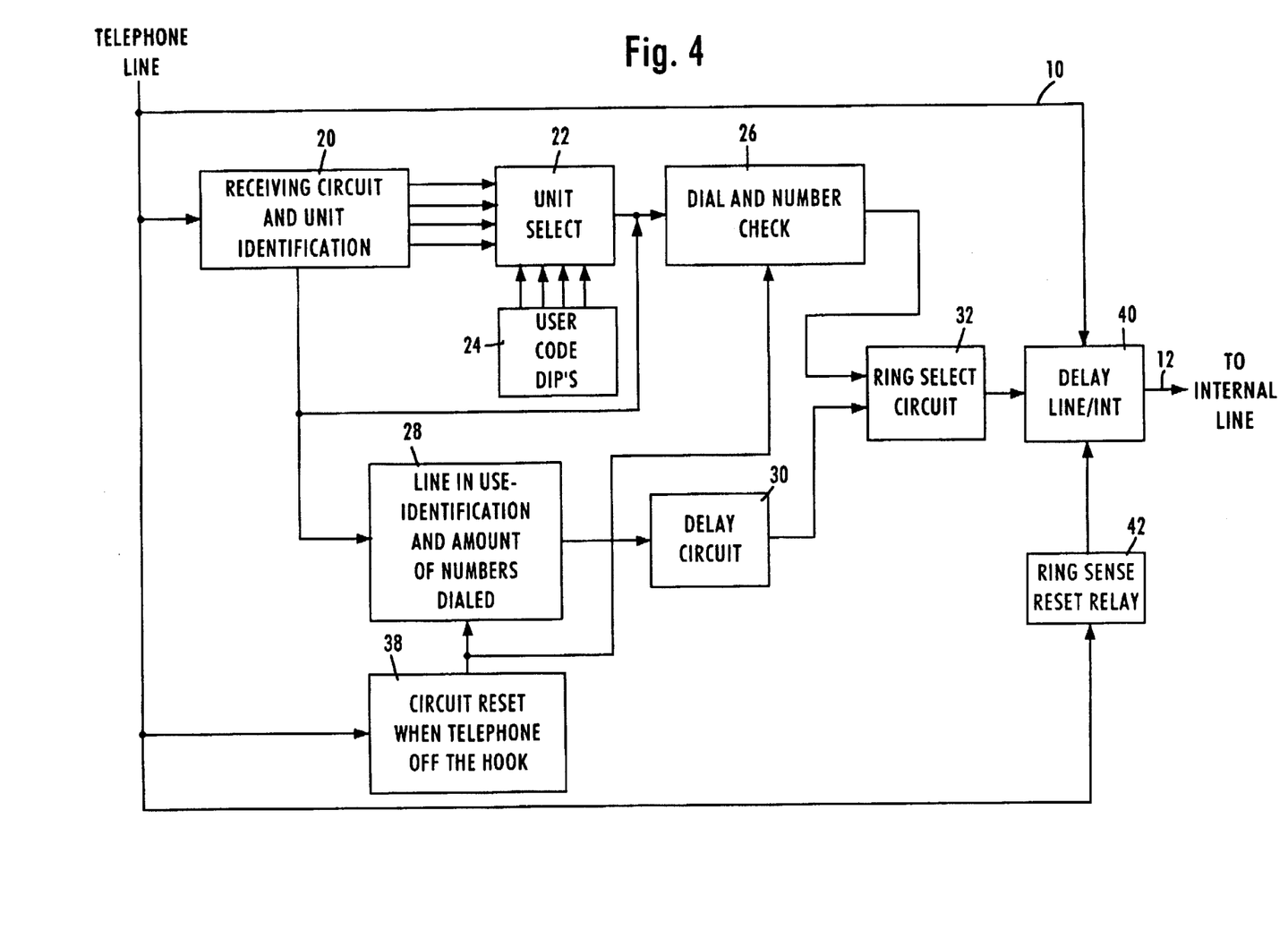
FIG. 4 is a schematic illustration of apparatus for suppressing a busy signal during prolonged intercom operation.

In accordance with one embodiment of the invention there may be provided apparatus 11 for suppressing a busy signal during intercom use, when such use extends beyond four seconds. This apparatus is typically connected in series between the central office telephone line 10 and the internal telephone line 12, as illustrated in FIG. 1. An example of such apparatus is illustrated in FIG. 4 and described hereinbelow. The apparatus is operative to decouple the internal telephone lines from the central office once intercom use extends beyond four seconds. Alternatively, if it is assumed that intercom use will not extend beyond 30 seconds, apparatus 11 may be eliminated.

Figure 2:
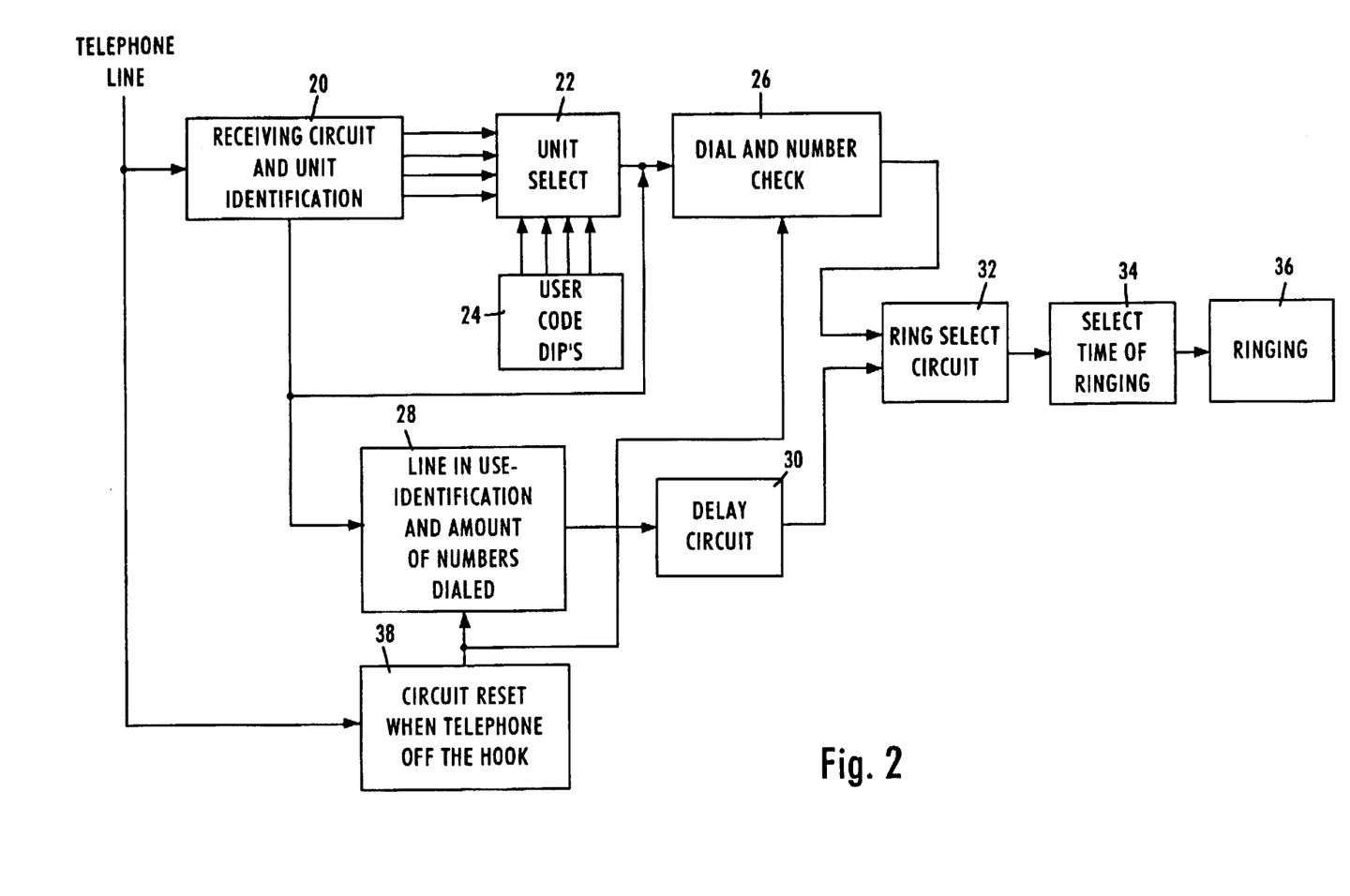
FIG. 2 is a block diagram illustration of an intercom function device constructed and operative in accordance with a preferred embodiment of the present invention.

Reference is now made to FIG. 2 which is a generalized block diagram illustration of intercom function device 16. The intercom function device 16 comprises receiving and unit identification circuitry 20 which is operative to receive an incoming DTMF/pulse tone combination representing dialing from another subscriber and which provides a digital output representing a single digit dialed number. Unit select circuitry 22, which cooperates with user code dip switches 24, determines whether the incoming single digit dialed number corresponds to the preset single digit identification code of a given device 16 which is coupled to a given telephone extension.

If the single digit dialed number corresponds to the single digit number of the device 16, unit select circuitry 22 provides an output to dial and number check circuitry 26 which indicates whether another single digit number has been dialed thereafter.

Receiving circuit 20 also provides an output indication of the receipt of a dialed single digit number to line in use identification and amount of numbers dialed determination circuitry 28, which is operative to reset a delay circuit 30, each time that a dialed single digit number is received. The delay circuit 30 is operative to provide an output indication to a ring select circuit 32, providing an AND function, when four seconds have passed from receipt of an initial single digit number without a further number having been received. Such an event indicates intended intercom use. In response to simultaneous receipt of inputs from delay circuit 30 and from dial and number check circuit 26, ring select circuitry provides a ring actuation output signal to a time of ring circuit 34, which determines the frequency and duration of a ring which indicates to a user, an intercom call. The output of circuit 34 may be provided to a ringer 36 in the device 16 or alternatively to a ringer in the telephone instrument 14.

When the telephone instrument 14 connected to device 16 is picked up, an appropriate voltage is received by circuit reset circuitry 38, which resets circuitry 26 and circuitry 28, eliminating their outputs to ring select circuitry 32.

Figure 3:
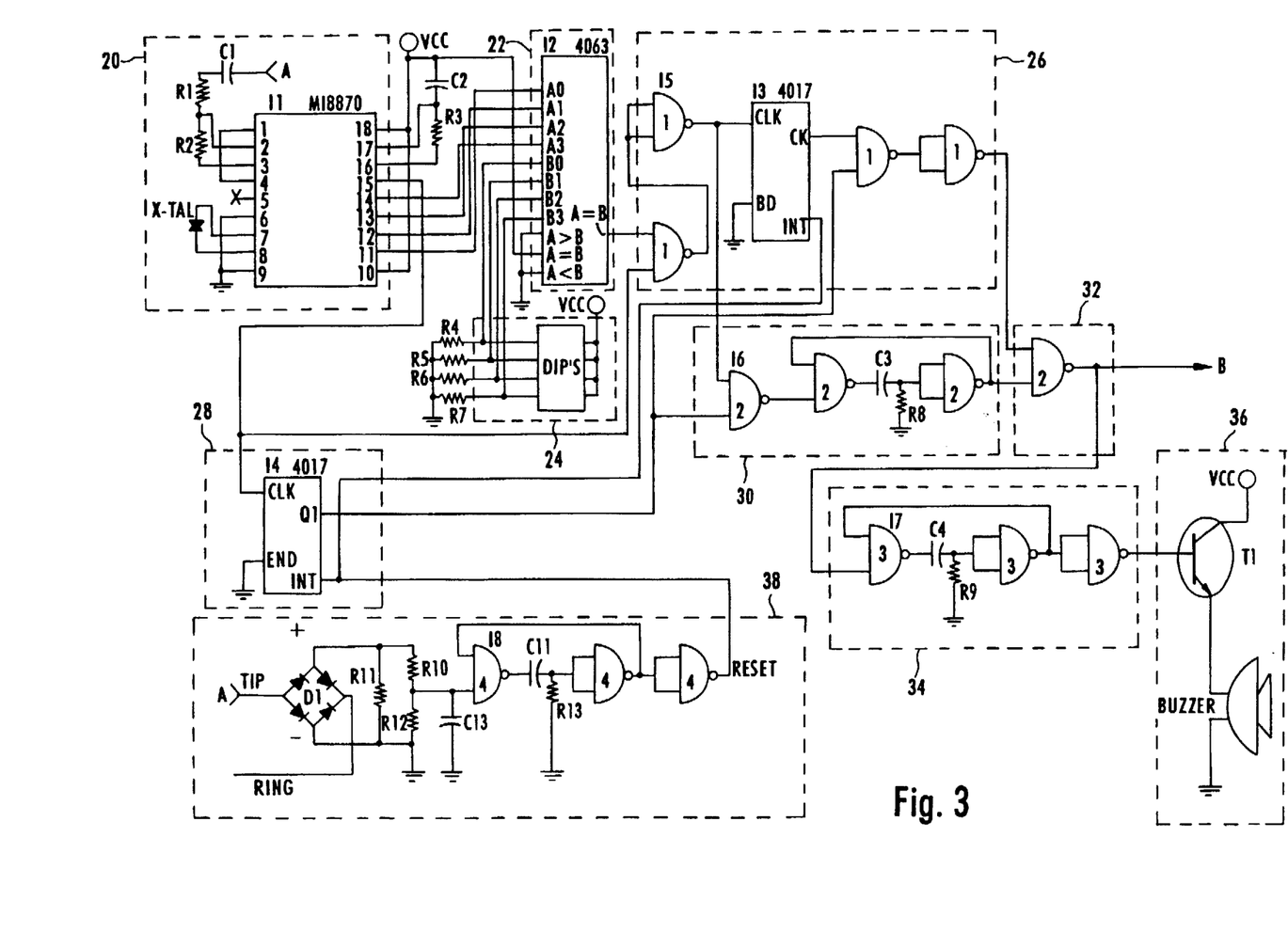
FIG. 3 is a circuit diagram corresponding to the block diagram illustration of FIG. 2.

Reference is now made to FIG. 3, which is a schematic illustration of the apparatus of FIG. 2. Each element of the block diagram of FIG. 2 is indicated by dashed lines on the schematic of FIG. 3. Component values for the schematic of FIG. 3 are as follows:

Resistors in ohms
R1=R2=R3=100K
R4=R5=R6=R7=47K
R8=470K
R9=300K
R10=R11=3M
R12=470K
R13=10K
Capacitors in Farads
C1=C2=100 NF
C3=C4=10 MF
C5=C6=C6=C7=C8=C9=C10=C11=100 NF
C12=0.1 MF Blue
C13=100 NF
Semiconductors
I1=MC 8870
I2=4063
I3=4017
I4=4017
I5=I6=I7=I8=4011

Reference is now made to FIG. 4, which illustrates apparatus for suppressing the busy signal from the central office. The circuitry is essentially identical to that of FIG. 2, with the removal of circuitry 34 and 36 and its replacement by a relay 40 which decouples the internal telephone lines downstream of apparatus 11 from the central office in response to an output of circuitry 32, until the telephone handset goes OFF-HOOK. Relay 40 receives a reset input from ring sense relay reset circuitry 42, which is described, together with relay 40, in detail in FIG. 5 and which receives an input from the telephone line in response to ringing from a dialed input from outside the system.

Figure 5:
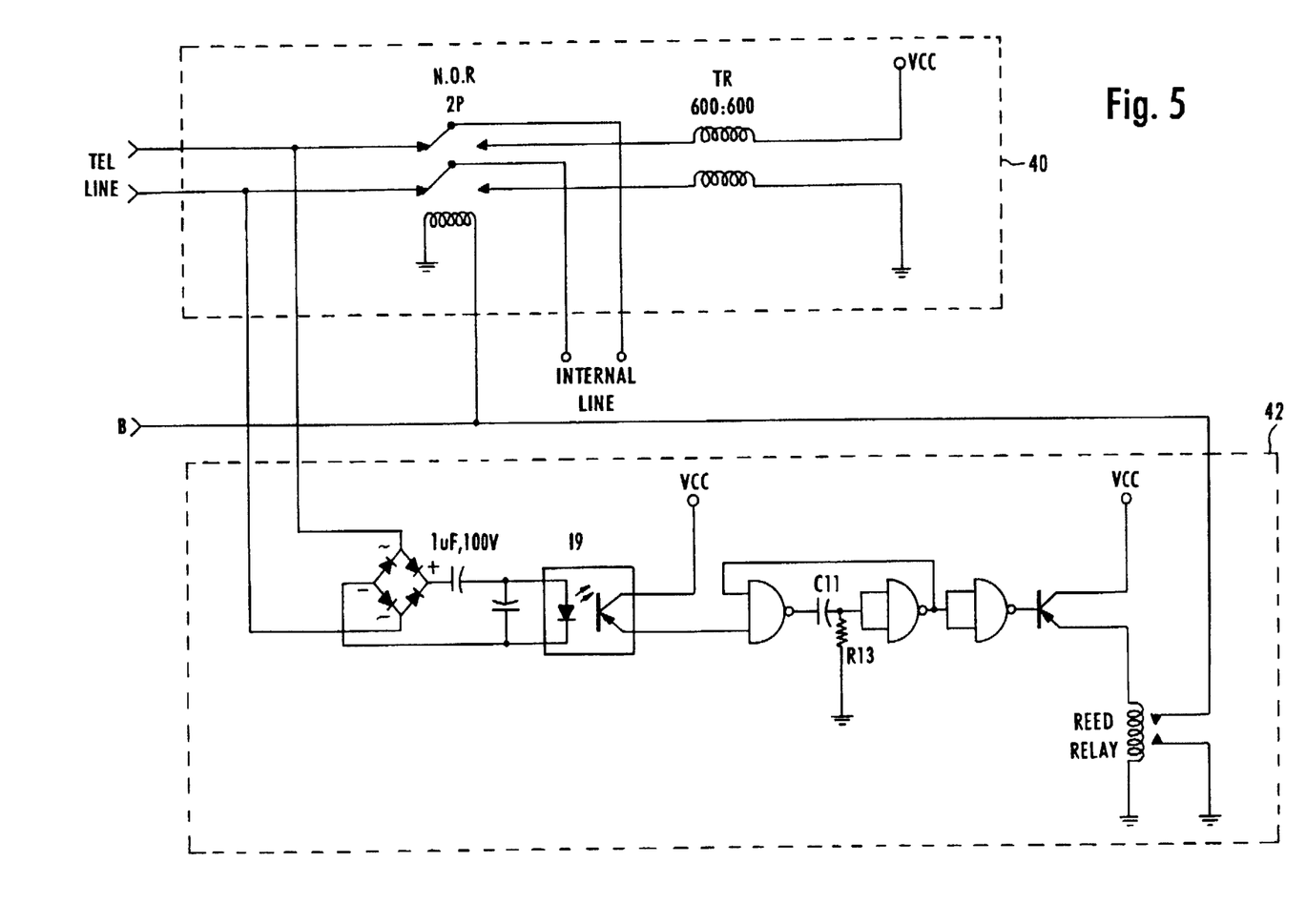
FIG. 5 is a schematic illustration of relay and ring sense relay reset apparatus forming part of the circuitry of FIG. 4.

Reference is now made to FIG. 5, which is a schematic illustration of elements 40 and 42 in the apparatus of FIG. 4. The values for the various components are identical to those provided hereinabove in connection with FIG. 3. The additional capacitor C14 has a value of 47 microfarads.

Figure 6:
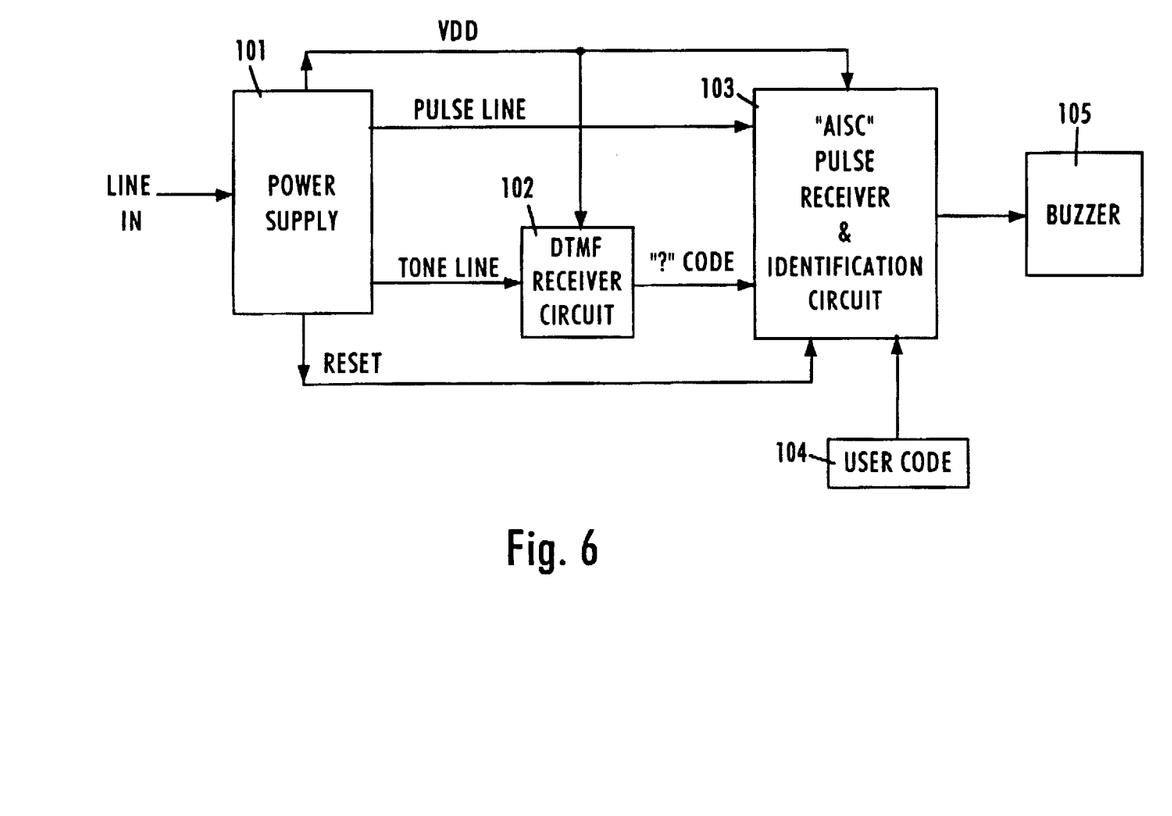
FIG. 6 illustrates a block diagram of an alternate embodiment of the intercom function apparatus.

Reference is now made to FIG. 6, which is a block diagram illustration of an alternate embodiment of the intercom function device according to the present invention. The intercom function device of this embodiment comprises power-supply circuitry 101 which is operating the device and provides the power to the DTMF/pulse receiver circuit 102 and to the "ASIC" pulse receiver and identification circuit 103. The power supply also provides reset signal to the pulse receiver identification circuit 103. Unit select circuitry 103, which cooperates with user code dip switches 104, determines whether the incoming single digit dialed number corresponds to the preset single digit identification code of a given intercom function device which is coupled to a given telephone extension.

When the telephone instrument connected to the device is picked up, an appropriate voltage is received by the power supply 101 providing voltage to circuitry 102 and 103. When the power supply senses line is in use, it operates circuitry 102 and 103. The two circuits are waiting to receive a digit by pulse or tone, and if the digit received is the same as the user code 104, and it is the only digit received, circuitry 103 will operate the buzzer 105. The preferred buzzer is a 3–5 V piezoelectric disc internal buzzer.

Figure 7:
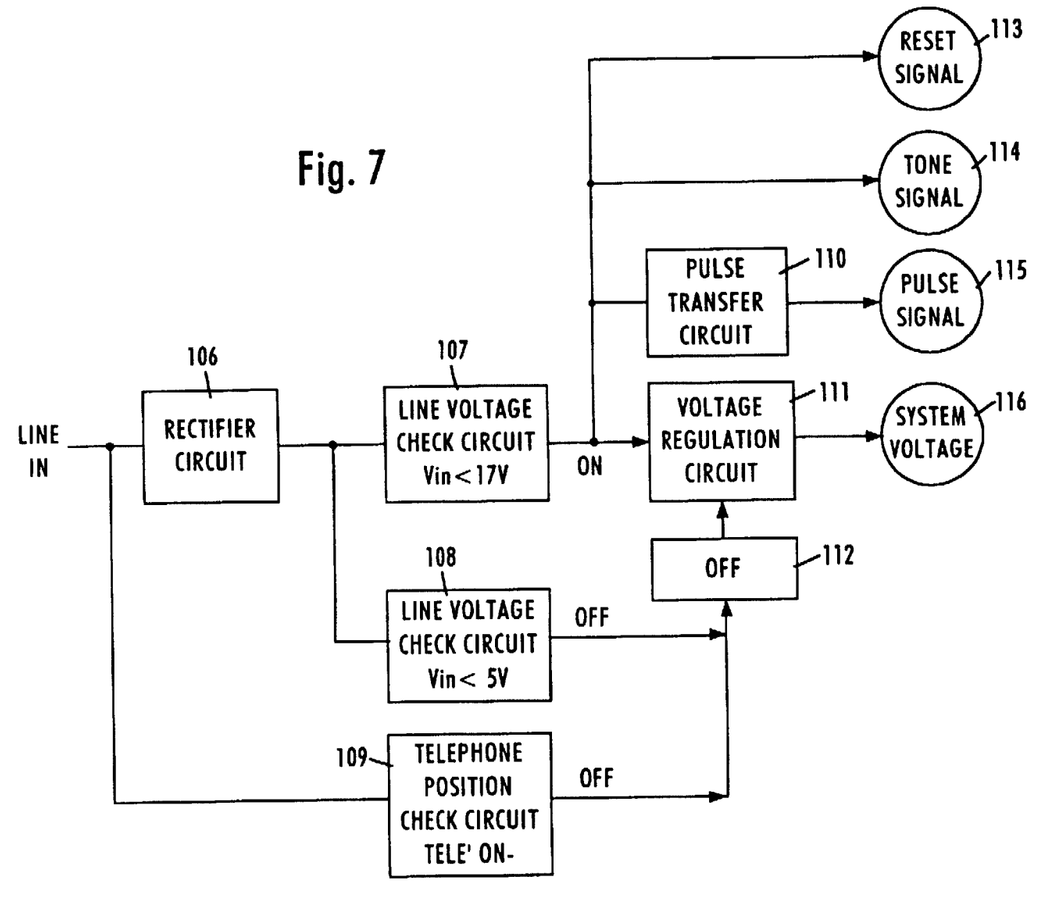
FIG. 7 is the power supply block diagram of the intercom function apparatus of FIG. 6.

Reference is now made to FIG. 7, which is the power supply block diagram. Rectifier circuit 106 provides DC voltage which is checked by circuitry 107 to find out if the line voltage drops below 17 V. If the line voltage is below 17 V, voltage regulation circuit 111 is operated and provides current to the system. The current is approximately 2.5–3 milliampere (3–5 V). Circuitry 108 is checking if the line voltage dropped below 5 V. If so, circuitry 108 will send an off signal to circuitry 111 and shut off the power. Circuitry 109 will send an off signal to circuitry 111 if the hand set is off the hook. Pulse transfer circuit 110 will provide pulse to the system without interference. Circuitry 106 and 107 provide the reset signal 113 and tone signal 114 to the system.

Figure 8:
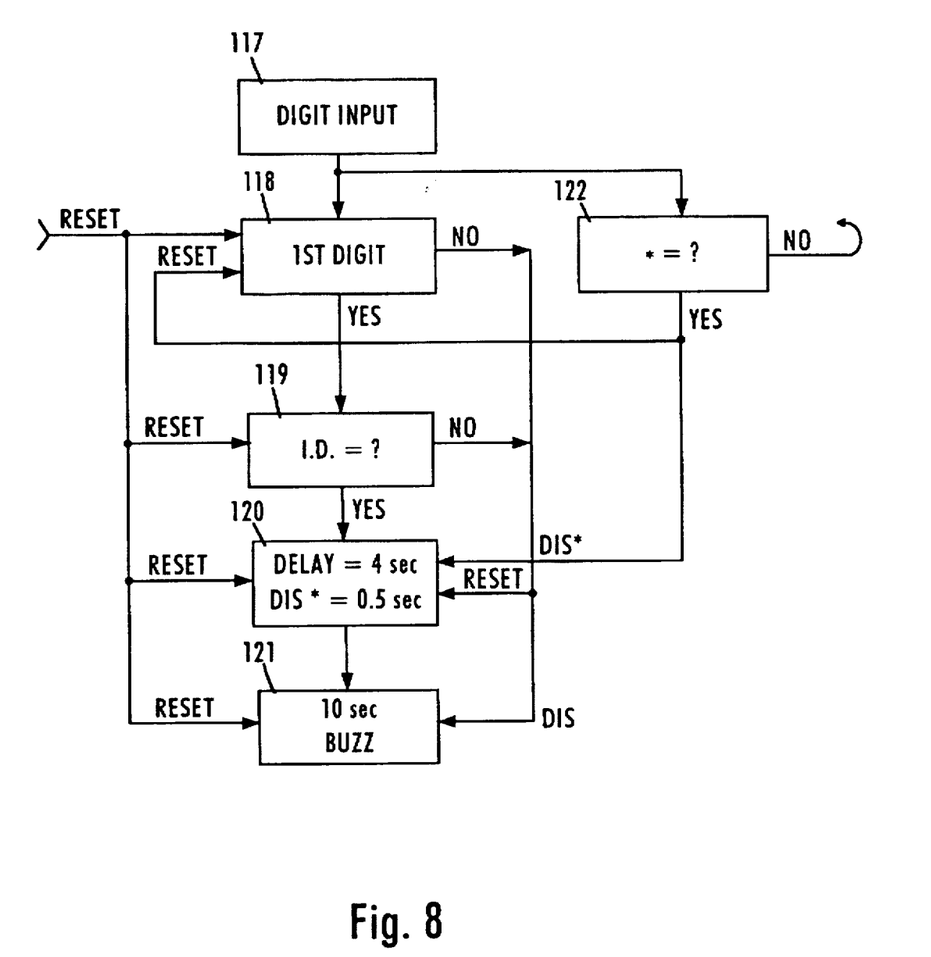
FIG. 8 describes "ASIC" floating chart of the embodiment of FIGS. 6 and 7.

Reference is now made to FIG. 8, which is the ASIC floating chart. When digit input 117 is received by first digit sensor 118 there are two options: (a) if a second digit appears then "no" signal will be sent to circuitry 118 and 119, this signal will reset circuitry 120 and disable the timer in circuitry 121; (b) if only one digit appears and it reaches the extension ID code in circuitry 119, a "yes" signal will be sent to circuitry 120, which, after four seconds, will operate the buzz signal for a period of ten seconds. If a star digit received by circuitry 122, it will reset circuitry 118, so that any digit after the star will be considered as the first digit. In the same way, circuit 122 will change the timer in circuit 120 from four seconds to 0.5 seconds, which means that circuit 120 will send buzz signal immediately after the digit appears.

Figure 9:
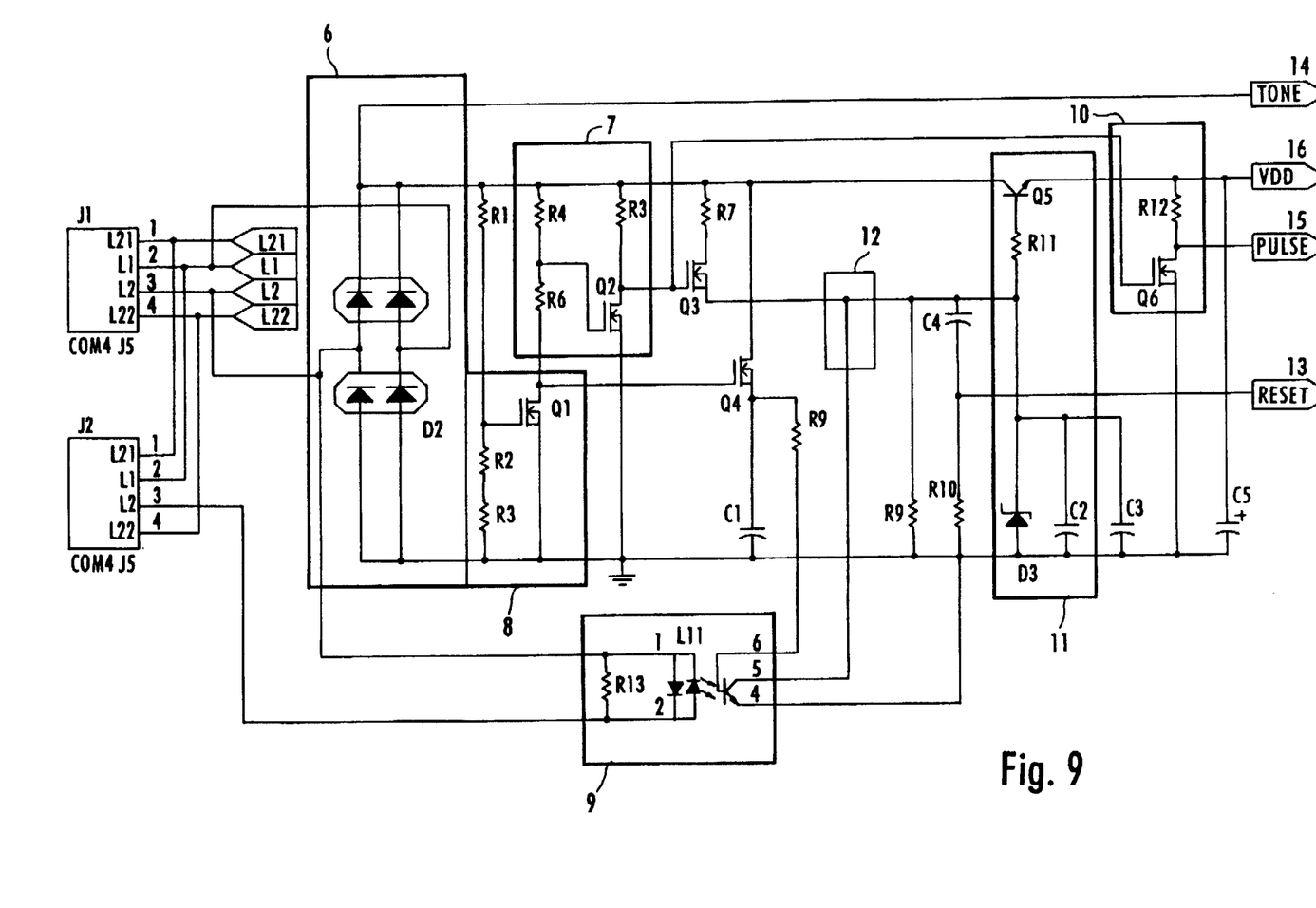
FIG. 9 is a schematic block diagram of the power supply of the embodiment of FIGS. 6–8.

Reference is now made to FIG. 9, which is a schematic illustration of the power supply. Each element of the block diagram of FIG. 7 is indicated by dashed lines on the schematic illustration of FIG. 9.

It will be understood that the circuitry of FIGS. 6-9 is operative during the first four seconds when a single digit DTMF/pulse number is received, for deciding that the number represents and intercom actuation number, rather than a normal dialed number. This decision is made on the basis of whether or not another dialed number is deemed to have been received.

Figure 10:
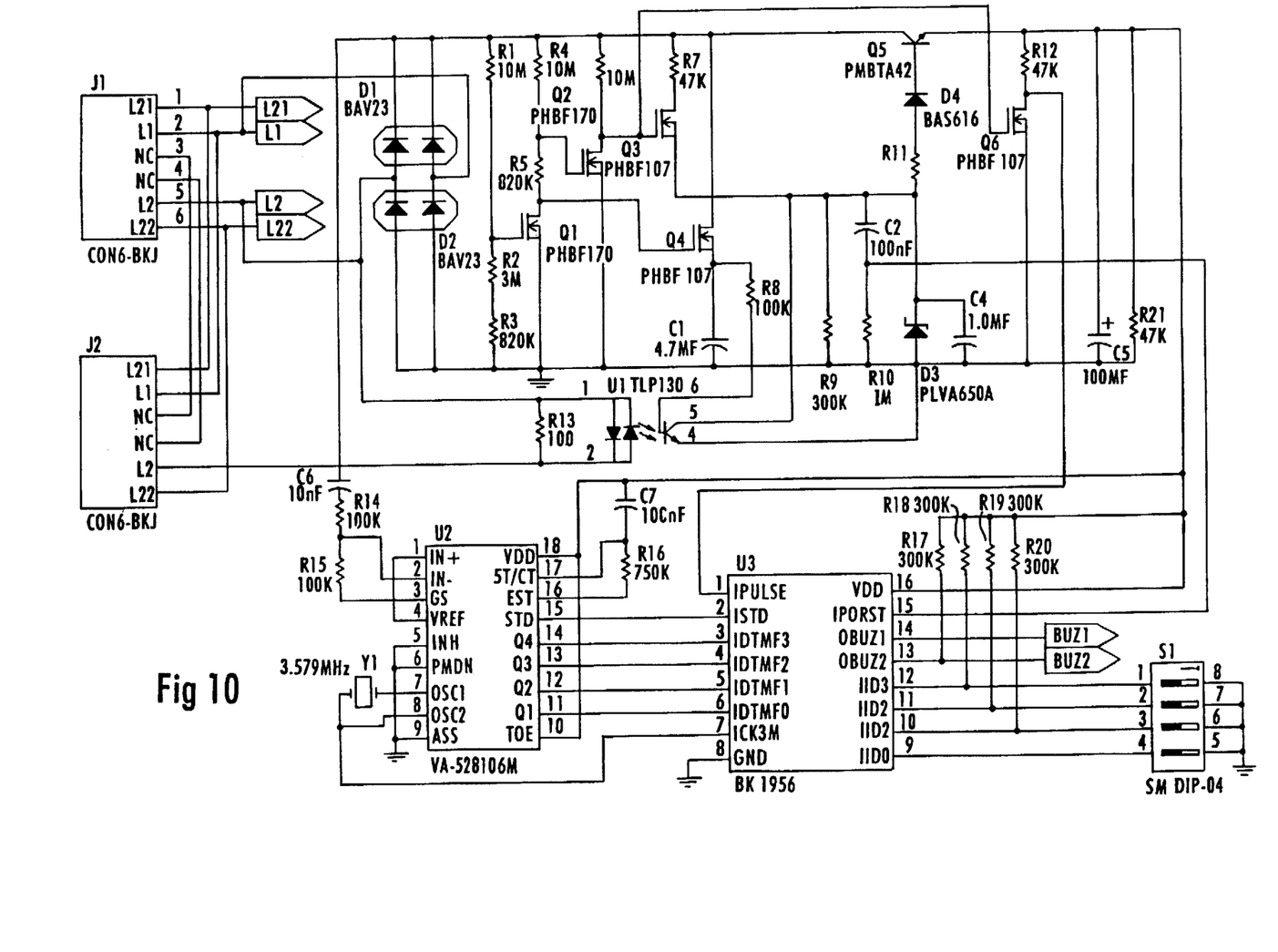
FIG. 10 is a circuit diagram of the complete electronic circuitry of the invention.

Reference is now made to FIG. 10, which is the circuit diagram of the complete electronic circuitry of the invention. The circuit in FIG. 10 includes the exact parts that are required to make the invention work. Specifically, the circuit includes, in addition to the power supply, a DTMF/pulse receiver named UM-92870-CM and an ASIC integrated circuit named BK-1956.

Figure 11:
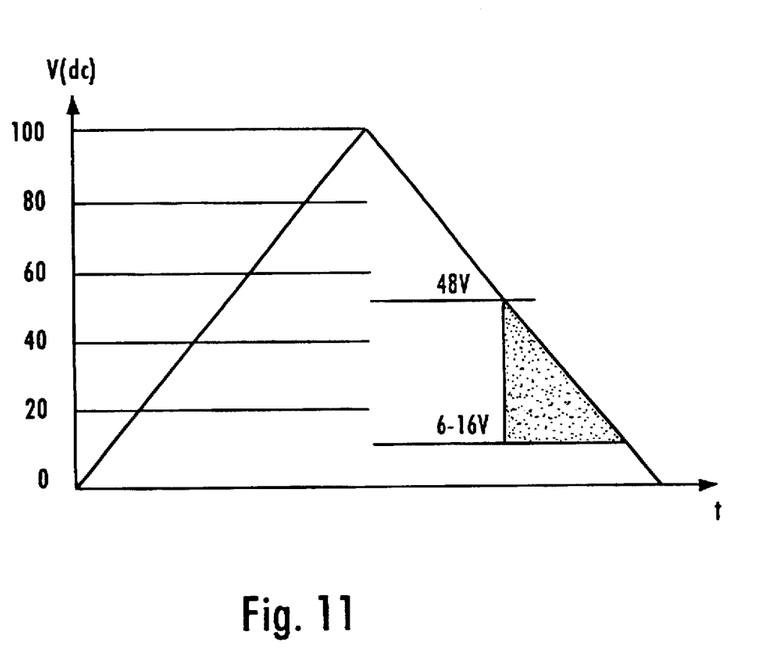
FIG. 11 is a graphical illustration of the problem in the U.S.A.

Reference is now made to FIG. 11, which is the graphical illustration of the problem in the U.S.A. The graphical illustration shows the manner in which the FCC lab in the United States checks the units that are connected to a telephone line. One of the tests is to raise the voltage line from 0 to 100 linearly and from 100 to 0. The results of this test preferably shows a constant line resistance of the unit. But, when the unit senses that the line voltage is dropping immediately from 48 V (volt dc) to 6-16 V (volt), the power supply of the unit becomes active and the unit is in operation mode.

Figure 12:
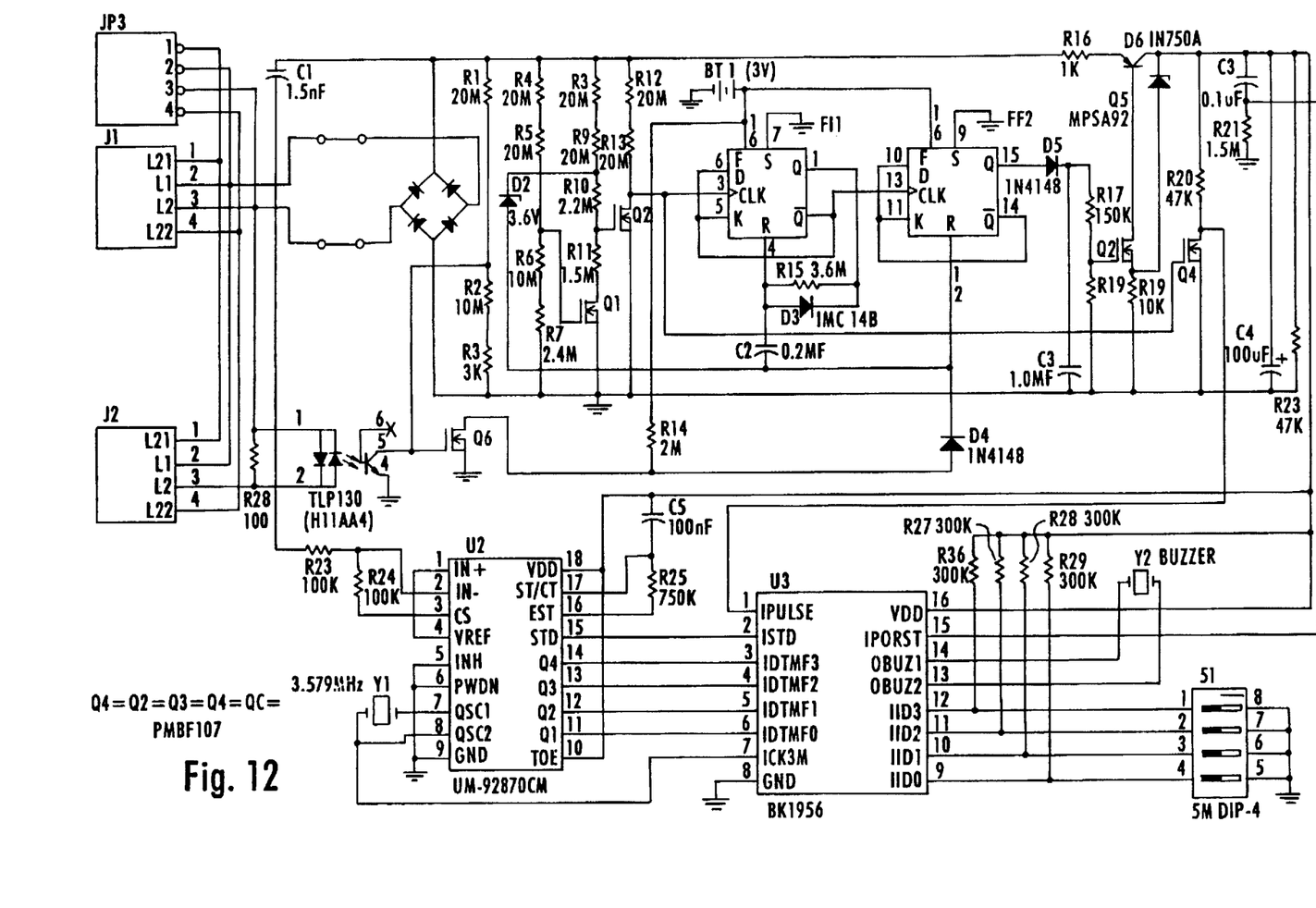
FIG. 12 is a circuit diagram for one embodiment of the complete electronic circuitry for use in the U.S.A.

Reference is now made to FIG. 12, which is the circuit diagram for one embodiment of the complete electronic circuitry for use in the U.S.A. The circuit diagram of FIG. 12 is almost identical as the basic circuit diagram of FIG. 10, with the same changes in the power supply as were made in FIG. 10. Additionally, integrated circuits FF1 and FF2 are the controllers for the activity illustrated in FIG. 11. Additionally, a 3 V battery is added to the power supply to permit use for at least five years and to assist the circuit in passing the test.

Figure 13:
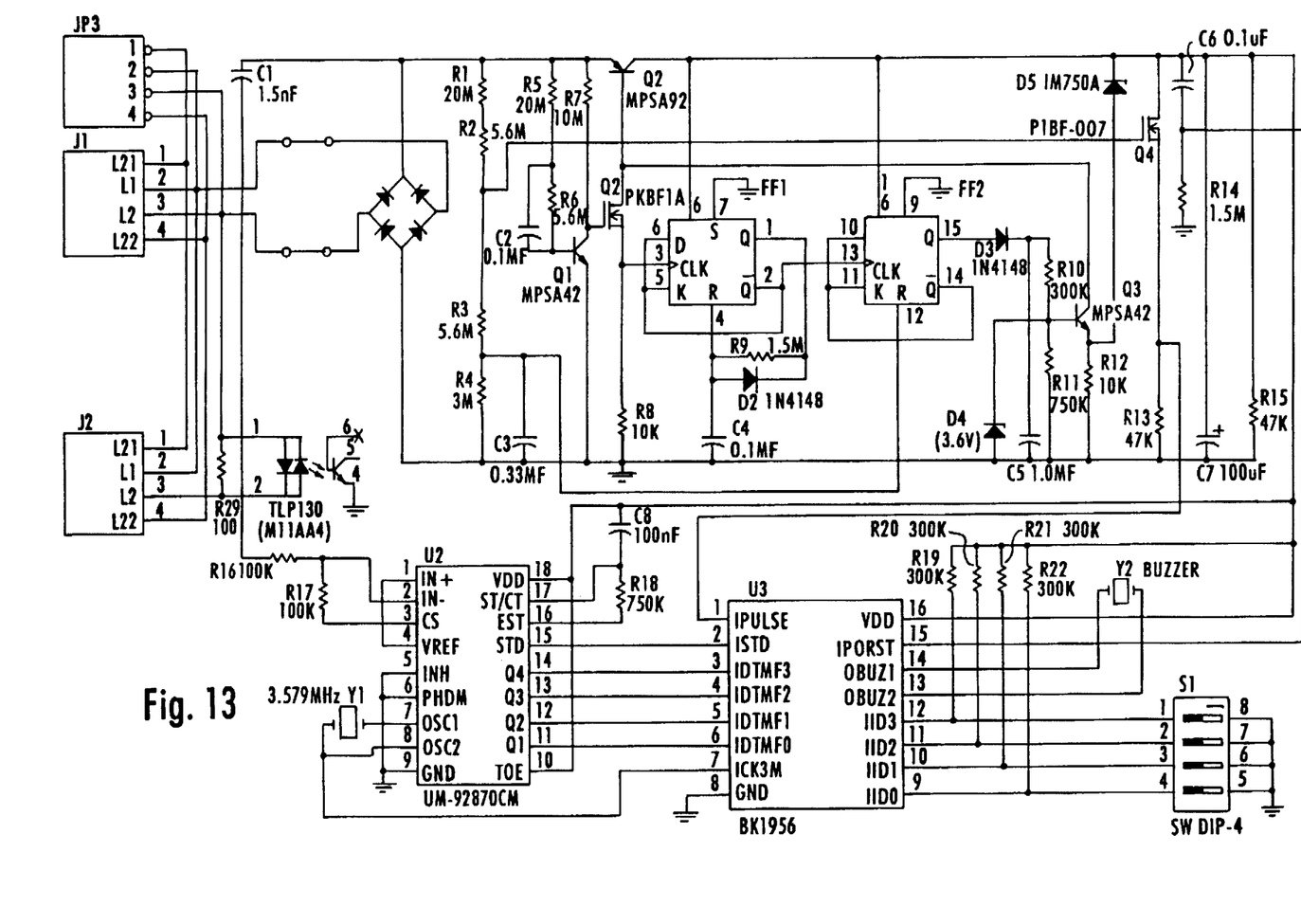
FIG. 13 is a circuit diagram for an alternate embodiment of the complete electronic circuitry for use in the U.S.A.

Reference is now made to FIG. 13, which is the circuit diagram of an alternate embodiment of complete electronic circuitry for use in the U.S.A. The circuit diagram is almost identical to the basic circuit diagram of FIG. 10, with the same changes made to the power supply. Integrated circuits FF1 and FF2 are the controllers for the activity illustrated in FIG. 11.

It will be appreciated by persons skilled in the art that the present invention is not limited by what has been particularly shown and described hereinabove. Rather, the scope of the present invention is defined only by the claims which follow.

I claim:

1. Apparatus for providing an intercom function on a telephone having DTMF or pulse capabilities including at least one intercom operation device arranged for connection to a DTMF or pulse telephone line and to a DTMF and pulse telephone instrument and comprising:

means for sensing a received extension address signal along the telephone line, determining whether the address corresponds to the telephone instrument to which the intercom operation apparatus is connected and, upon determination of correspondence, providing an extension selection ring output, and an internal power supply wherein said power supply uses only the telephone line voltage;

an internal DTMF receiver circuit unit, an internal pulse receiver and an identification integrated circuit unit and a buzzer; and wherein the internal power supply unit provides 3-5 volts to the system and 2.5-3 milliampere during operation.

2. Apparatus for providing an intercom function on a telephone having DTMF or pulse capabilities including at least one intercom operation device arranged for connection to a DTMF or pulse telephone line and to a DTMF and pulse telephone instrument and comprising:

means for sensing a received extension address signal along the telephone line, determining whether the address corresponds to the telephone instrument to which the intercom operation apparatus is connected and, upon determination of correspondence, providing an extension selection ring output, and an internal power supply wherein said power supply uses only the telephone line voltage;

further comprising an internal power supply unit using the telephone line voltage, internal DTMF receiver circuit unit, internal pulse receiver and identification integrated circuit unit and a buzzer, wherein the internal power supply unit provides current to the system only when the telephone line voltage is between 17 V and 5 V.

3. Apparatus according to claim 2, wherein the internal power supply unit operates automatically when the telephone line voltage drops below 17 V.

4. Apparatus according to claim 2, wherein the internal power supply unit stops to operate automatically when the telephone line voltage drops below 5 V.

* * * * *